United States Patent [19]
Delobel et al.

[11] Patent Number: 5,378,439
[45] Date of Patent: Jan. 3, 1995

[54] PROCESS FOR REMOVING GASEOUS HYDRIDES FROM A SOLID SUPPORT COMPRISING METALLIC OXIDES

[75] Inventors: Olivier Delobel, Paris; Jean Louise, Villejuif; Philippe Cornut, Echirolles, all of France

[73] Assignee: L'Air Liquide, Societe Anonyme Pour l'Etude et l'Exploitation des Procedes Georges Claude, Paris, France

[21] Appl. No.: 914,215

[22] Filed: Jul. 16, 1992

Related U.S. Application Data

[63] Continuation of Ser. No. 583,432, Sep. 17, 1990, abandoned.

[30] Foreign Application Priority Data

Sep. 22, 1989 [FR] France ................. 89 12448

[51] Int. Cl.⁶ ............................................ B01D 53/34
[52] U.S. Cl. ............................... 423/210; 423/230
[58] Field of Search .............. 423/210, 230; 55/68, 55/72; 95/116, 136

[56] References Cited

U.S. PATENT DOCUMENTS

| | | |
|---|---|---|
| 4,048,387 | 9/1977 | Lahme et al. .................. 423/210 |
| 4,532,115 | 7/1985 | Nishino et al. ................ 423/210 |
| 4,605,812 | 8/1986 | Nowack et al. ................ 423/210 |
| 4,910,001 | 3/1990 | Kitahara et al. ............... 423/210 |
| 4,996,030 | 2/1991 | Kitahara et al. ............... 423/210 |

FOREIGN PATENT DOCUMENTS

| | | |
|---|---|---|
| 0060742 | 9/1982 | European Pat. Off. . |
| 0194366 | 9/1986 | European Pat. Off. . |
| 280585 | 8/1988 | European Pat. Off. ........... 423/210 |
| 2063216 | 7/1971 | France . |
| 62-95119 | 5/1987 | Japan ............................. 423/210 |
| 62-286520 | 12/1987 | Japan ............................. 423/210 |
| 2114911 | 9/1983 | United Kingdom . |

*Primary Examiner*—Gary P. Straub
*Assistant Examiner*—Peter DiMauro
*Attorney, Agent, or Firm*—Young & Thompson

[57] ABSTRACT

The invention concerns a process for removing gaseous hydrides from a solid support of metallic oxides, which consists in causing a gas flow to circulate, at room temperature, on a solid support comprising at least copper and chromium and having a specific area lower than or equal to 100 $m^2/g$. This process may be used for the destruction of gaseous hydrides from the industry of semi-conductors, for example silanes, arsine, phosphine, diborane, germane, stannane, gallane, stibine, and hydrogen telluride, selenide and sulfide.

21 Claims, 1 Drawing Sheet

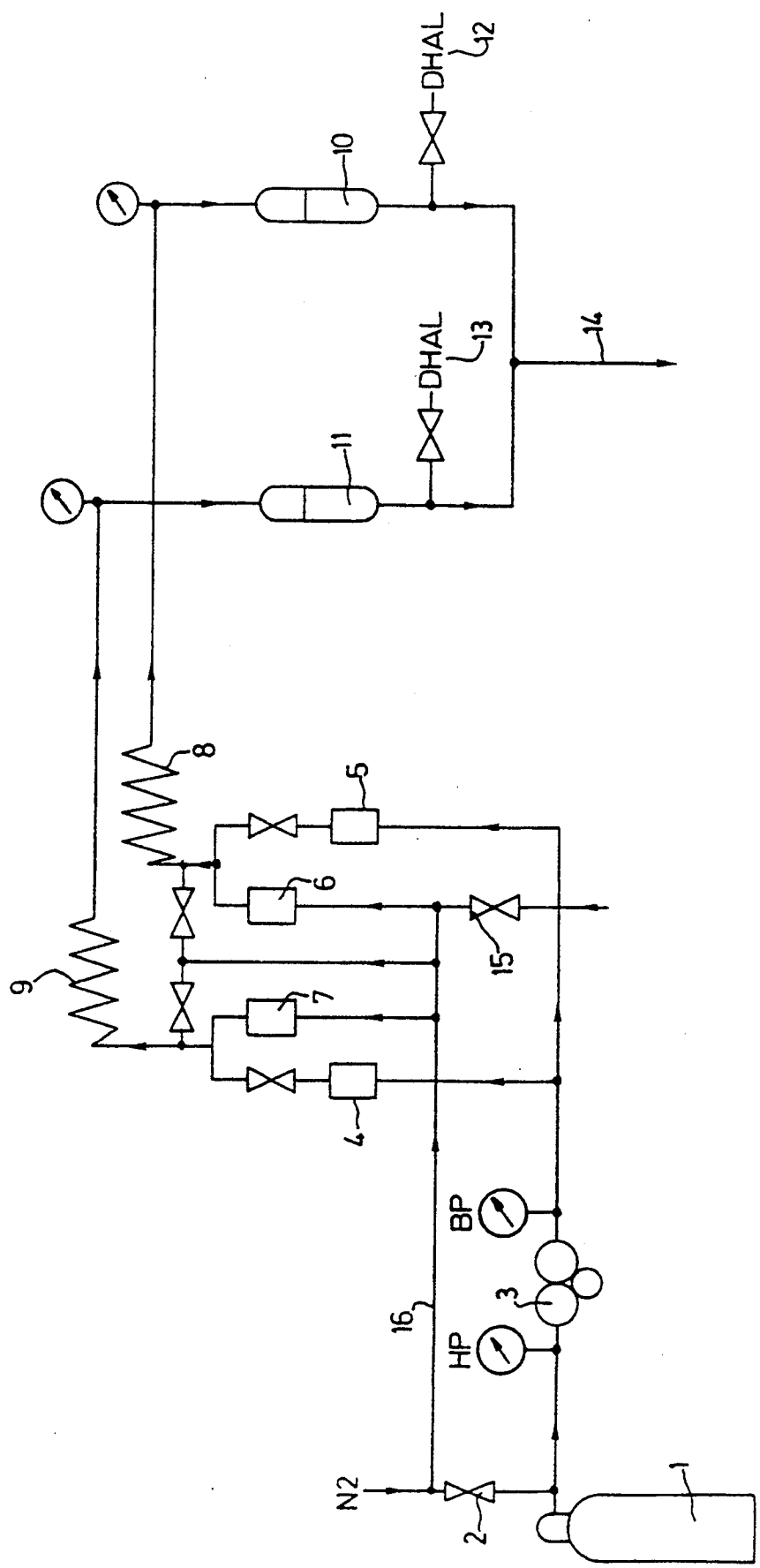

PROCESS FOR REMOVING GASEOUS HYDRIDES FROM A SOLID SUPPORT COMPRISING METALLIC OXIDES

This application is a continuation of application Ser. No. 07/583,432, filed Sep. 17, 1990, now abandoned.

BACKGROUND OF INVENTION (a) Field of the Invention

The present invention concerns a process for removing gaseous hydrides from a solid support of metallic oxides.

(b) Description of Prior Art

Gaseous hydrides such as silanes, arsine, phosphine, diborane, germane, stannane, gallane, stibine, hydrogen telluride, selenide or sulfide are compounds which are largely used in the industry of semi-conductors and industries related to optic fibers, new materials, etc. In this type of industry, the chemical reactions within manufacturing reactors are never complete and sometimes substantial quantities of these gases are found at the outlet of pumping systems as well as during flushing of the lines used.

Because of the highly toxic and inflammable character of these gases, it appears essential to provide highly efficient treating devices which enable to obtain reject gases in which the hydrides do not exceed admissible minimum concentrations which for example are in the order of 0.05 ppm for arsine, 0.3 ppm for phosphine, 5 ppm for silane and 0.1 ppm for diborane.

Among the existing industrial technologies, the destruction of gaseous hydride on solid reactive materials has already produced interesting results. However, it appears necessary to find solid phases which are more reliable and more performing with respect to lifespan.

SUMMARY OF INVENTION

Thus the applicant has discovered that certain solids supports, which are available in the industry, could enable to treat hydride gases rejected by the industry of semi-conductors and related industries with a very high efficiency.

These solid supports are compounds of metallic oxides containing at least one of the elements comprising copper and chromium and having a specific area lower than or equal to 100 m$^2$/g.

It is therefore an object of the present invention to provide a process for removing gaseous hydrides consisting in causing the gas flow containing these hydrides diluted in an inert gas, to circulate, at room temperature, on a solid support comprising at least copper and chromium and having a specific area lower than or equal to 100 m$^2$/g.

The process according to the invention may be used for the destruction of gaseous hydrides such as silanes and more particularly silane $SiH_4$, arsine $AsH_3$, phosphine $PH_3$, diborane $B_2H_6$, germane, stannane $SnH_4$, gallane $GaH_3$, stibine $SbH_3$, hydrogen telluride $TeH_2$, hydrogen selenide $SeH_2$ and hydrogen sulfide $H_2S$.

The reaction is carried out at room temperature but since it is highly exothermic, the temperature of the apparatus must be controlled, either by outside cooling or by increasing the inert gas used for dilution. A pressure close to atmospheric pressure is used.

The solid support is in the form of granular materials ready for use. A simple treatment with nitrogen is sufficient to make it inert before use.

This solid support has the great advantage that it can be regenerated after saturation. This regeneration, which may also be carried out before complete saturation, is carried out by passing a gas flow containing a perfectly controlled oxygen content in nitrogen through the apparatus, this oxygen content being of the order of 1 to 5% by volume and preferably from 1 to 2% by volume.

The regeneration gas flow ensures the reoxidation of the metallic elements which have been previously reduced by the passage and the destruction of the hydrides.

Since the oxidation is also highly exothermic, it is recommended to control the change of temperature with accuracy.

The regeneration cycle may be renewed many times.

According to a preferred embodiment of the process of the invention, in addition to copper and chromium, the solid support also contains manganese.

According to a particularly preferred embodiment of the process according to the invention, the solid support used for the removal of the gaseous hydrides also contains barium which consolidates the support, increases its lifespan and promotes the diffusion of the gases towards the active sites of the solid support.

The solid support used in the process according to the invention preferably has the following composition:

Cu 25 to 70 weight %
Cr 15 to 40% weight %
Ba 0 to 15% weight %
Mn 0 to 5% weight %

The inert gas used for the dilution of the gaseous hydrides is preferably nitrogen.

The volume concentration of the hydrides in the gas flow hydride—dilution inert gas is 0.1 to 10 volume %, and preferably 1 to 5 volume %.

The process according to the invention is used with gas flows that one skilled in the art will be able to adapt as a function of the time of residence of the gas flow on the solid support, and in order to obtain turbulent conditions.

BRIEF DESCRIPTION OF DRAWING

The invention will be better understood from a study of the detailed description of a preferred embodiment of the invention given by way of example but without limitation and in which the single figure represents an apparatus which can be used to carry out the process of the invention.

DESCRIPTION OF PREFERRED EMBODIMENTS

The gaseous hydride flow is introduced into the apparatus from a container under pressure 1, while dilution nitrogen is introduced through valve 2. This gas mixture is sent to a pressure reducer 3, then in mass flow regulators 4 and/or 5, in homogenisers 8 and/or 9, to reach cartridges 10 and/or 11, which are here made of glass and which contain the solid support of metallic oxides. Hydride detectors (DHAL) 12 and 13 are mounted at the outlet of the cartridges containing the solid support and pick up a sample of a portion of the gas flow treated in order to monitor the destruction of the hydrides which are present therein. The gas flow(s) are thereafter sent at 14 towards a container containing a catalyst of the type Hopcalite before being sent back to free air.

Mass flow regulators 6 and 7 are also provided to control the flow of regeneration gas introduced at 15.

Nitrogen which is used as flushing gas may also be introduced at 16 in order to flush the apparatus at the end of the cycle.

The mass regulators 4 and 5 on the one hand and 6 and 7 on the other hand, homogenisers 8 and 9 as well as the solid support cartridges 10 and 11 and the hydride detectors 12 and 13 can operate in parallel or alternately, the solid supports found at 10 and 11 being identical or different.

The process of the invention will be better illustrated by means of the examples which follow which are given only as illustrations and are not intended to limit the scope of the invention.

EXAMPLE 1

A gas flow containing 5 volume % phosphine in nitrogen, with a total flow of 50 l/h is sent over a solid support or catalyst containing 42 weight % copper and 26.5 weight % chromium, the balance consisting of oxygen, having a specific area of 40 m$^2$/g and an apparent density of 1.8. The maximum temperature measured is 120° C.

The amount of destruction of phosphine is 75 liters of phosphine per liter of solid support after two cycles of destruction and two cycles of regeneration.

In order to prevent that the container containing the solid support warms up too rapidly, the following operating conditions are used for the regeneration of the solid support:

total flow: 50 l/hr
O$_2$ content: 2 volume %
maximum temperature measured: 120° C.

The various operating parameters and the results obtained are given in the following table 1.

TABLE I

| Catalyst 1 Mass 1031 g Volume 560 cm$^3$ | | | | | | |
|---|---|---|---|---|---|---|
| | 1st Destruction | 1st Regeneration | | 2nd Destruction | 2nd Regeneration | |
| Total flow l/hr | 50 | 50 | 50 | 50 | 50 | 50 |
| Concentration in PH$_3$ | 5% | | | 5% | | |
| Concentration in O$_2$ | | 2% | 5% | | 2% | 5% |
| Temp. maxi. internal °C. | 92 | 48 | 25 | 37 | 48 | 39 |
| Temp. maxi. wall °C. | 51 | | | | | |
| Volume PH$_3$ destroyed l | 39 | | | 2.5 | | |
| Volume O$_2$ in l | | 15 | | | 9.8 | |
| Yield l PH$_3$/l catalyst | 70 | | | 75 | | |
| Vol. total O$_2$ l/l catalyst | | 27 | | | 45 | |

EXAMPLE 2

The operation is the same, as in example 1, exept that there is used a solid support consisting of 33 weight % copper, 27.5 weight % chromium and 11.5 weight % barium, the remainder consisting of oxygen, having a specific area of 30 m$^2$/g and an apparent density of 1.8.

The amount of destruction of phosphine is 79 l/l of solid support after two cycles of destruction and two cycles of regeneration.

The process of regeneration on solid support is identical to that of example 1.

The operating parameters and the results are given in the following table 2.

TABLE 2

| Catalyst 2 Mass 1045 g Volume 650 cm$^3$ | | | | | | |
|---|---|---|---|---|---|---|
| | 1st Destruction | 1st Regeneration | | 2nd Destruction | 2nd Regeneration | |
| Total flow l/hr | 50 | 50 | 50 | 50 | 50 | 50 |
| Concentration in PH$_3$ | 5% | | | 5% | | |
| Concentration in O$_2$ | | 2% | 5% | | 2% | 5% |
| Temp. maxi. internal °C. | 108 | 25 | 22 | 65 | 26 | 26 |
| Temp. maxi. wall °C. | 58 | | | 47 | | |
| Volume PH$_3$ destroyed l | 44 | | | 7.5 | | |
| Volume O$_2$ in l | | 15 | | | 9.8 | |
| Yield l PH$_3$/l catalyst | 67 | | | 79 | | |
| Vol. total O$_2$ l/l catalyst | | 24 | | | 39 | |

EXAMPLE 3

The operation is the same as in the previous examples except that there is used a catalyst containing 35 weight % copper, 31 weight % chromium, 2 weight % barium and 2.5 weight % manganese, the balance consisting of oxygen, having a specific area of 30 m$^2$/g and an apparent density of 1.8.

The amount of destruction of phosphine is 95 l/l of solid support after three cycles of destruction and three cycles of regeneration.

The process of regeneration of the solid support is the same as the one of example 1.

The operating parameters and the results obtained are given in the following table 3.

TABLE 3

| Catalyst 3 Mass 1014 g Volume 530 cm$^3$ | | | | | | |
|---|---|---|---|---|---|---|
| | 1st Destruction | 1st Regeneration | 2nd Destruction | 2nd Regeneration | 3rd Destruction | 3rd Regeneration |
| Total flow l/hr | 50 | 50 | 50 | 50 | 50 | 50 |
| Concentration in PH$_3$ | 5% | | 5% | | 5% | |
| Concentration in O$_2$ | | 2% | | 2% | | 4% |

TABLE 3-continued

| | Catalyst 3 Mass 1014 g Volume 530 cm$^3$ | | | | | |
|---|---|---|---|---|---|---|
| | 1st Destruction | 1st Regeneration | 2nd Destruction | 2nd Regeneration | 3rd Destruction | 3rd Regeneration |
| Temp. maxi. internal °C. | 109 | 100 | 67 | 43 | 36 | 98 |
| Volume PH$_3$ destroyed 1 | 39.2 | | 8.7 | | 2.3 | |
| Volume O$_2$ in 1 | | 20 | | 25 | | 19 |
| Yield 1 PH$_3$/1 catalyst | 74 | | 90.5 | | 94.8 | |
| Vol. total O$_2$ 1/1 catalyst | | 38 | | 83 | | 120 |

EXAMPLE 4

A gas flow containing 2.5 volume % of arsine AsH$_3$ in nitrogen is allowed to pass with a flow of 120 l/hr on a solid support containing 35 weight % copper, 31 weight % chromium, 3.2 weight % barium and 2.5% weight % managanese, the balance consisting of oxygen, having a specific area of 30 m$^2$/g and an apparent density of 1.8.

A cartridge having a diameter of 80 mm containing 1252 g of solid support having a volume of 700 cm$^3$, is used.

The rate of destruction of arsine is 70 1/1 of solid support.

The process of regeneration of the solid support is the same as previously.

We claim:

1. Process for removing gaseous inorganic hydrides from a gas stream, comprising circulating a gas flow containing the hydrides diluted in an inert gas, on a solid support consisting essentially of metallic oxides of manganese, copper and chromium, and having a specific area lower than or equal to 100 m$^2$/g, said solid support having from 2.5 to 5 weight % Mn, 25 to 70 weight % Cu, and 15 to 40 weight % Cr, and wherein said hydrides are selected from the group consisting of silanes, phosphine, diborane, germane, stannane, gallane, hydrogen telluride and hydrogen selenide.

2. Process according to claim 1, wherein the inert gas is nitrogen.

3. Process according to claim 1, wherein the volume concentration of the hydrides in the gas flow is comprised between 1 and 10 volume %.

4. Process according to claim 1, wherein the volume concentration of the hydrides in the gas flow is comprised between 5 and 10 volume %.

5. Process according to claim 1, and subjecting the solid support to at least one regeneration cycle.

6. Process according to claim 5, wherein the regeneration is carried out by exposing the solid support to a gas flow containing 1 to 5 volume % oxygen.

7. Process for removing gaseous inorganic hydrides from a gas stream, comprising circulating a gas flow containing from 2.5 to 10 volume % of the hydrides diluted in an inert gas, on a solid support consisting essentially of metallic oxides of copper, chromium, barium and manganese said manganese being present in an amount from 2.5 to 5 weight %, and having a specific area lower than or equal to 100 m$^2$/g.

8. Process according to claim 7, wherein the solid support comprises at most 15 weight % barium.

9. Process according to claim 7, wherein the inert gas is nitrogen.

10. Process according to claim 7, wherein the gaseous hydrides are selected from the group consisting of silanes, arsine, phosphine, diborane, germane, stannane, gallane, stibine, hydrogen telluride, hydrogen selenide and hydrogen sulfide.

11. Process according to claim 7, wherein the gaseous hydrides are selected from the group consisting of silanes, phosphine, diborane, germane, stannane, gallane, hydrogen telluride and hydrogen selenide.

12. Process according to claim 11, wherein the gaseous hydride is SiH$_4$.

13. Process according to claim 7, wherein the concentration of the hydrides in the gas flow is comprised between 5 and 10 volume %.

14. Process according to claim 7, and subjecting the solid support to at least one regeneration cycle.

15. Process according to claim 14, wherein the regeneration is carried out by exposing the solid support to a gas flow containing 1 to 5 volume % oxygen.

16. Process for removing gaseous inorganic hydrides from a gas stream, comprising circulating a gas flow containing from 1 to 10 volume % of the hydrides diluted in an inert gas, on a solid support consisting essentially of metallic oxides of copper, chromium, barium and manganese said manganese being present in an amount from 2.5 to 5 weight %, and having a specific area lower than or equal to 100 m$^2$/g, said hydrides being selected from the group consisting of silanes, phosphine, diborane, germane, stannane, gallane, hydrogen telluride and hydrogen selenide.

17. Process according to claim 16, wherein the inert gas is nitrogen.

18. Process according to claim 16, wherein the volume concentration of the hydrides in the gas flow is comprised between 5 and 10 volume %.

19. Process according to claim 16, and subjecting the solid support to at least one regeneration cycle.

20. Process according to claim 19, wherein the regeneration is carried out by exposing the solid support to a gas flow containing 1 to 5 volume % oxygen.

21. Process for removing gaseous inorganic hydrides from a gas stream, comprising circulating a gas flow containing the hydrides diluted in an inert gas, on a solid support consisting essentially of metallic oxides of manganese, copper, chromium, and barium, and having a specific area lower than or equal to 100 m$^2$/g, said solid support having from 2.5 to 5 weight % Mn, 25 to 70 weight % Cu, and 14 to 40 weight % Cr, and wherein said hydrides are selected from the group consisting of silanes, phosphine, diborane, germane, stannane, gallane, hydrogen telluride and hydrogen selenide.

* * * * *